(12) United States Patent
Boué et al.

(10) Patent No.: US 12,511,321 B1
(45) Date of Patent: Dec. 30, 2025

(54) SYSTEM AND METHOD FOR SEMANTIC SEARCHING OF ABBREVIATED TERMS USING TELEMETRY DATA-TRAINED NEURAL NETWORKS

(71) Applicant: Microsoft Technology Licensing, LLC, Redmond, WA (US)

(72) Inventors: Laurent Boué, Petah Tikva (IL); Kiran Rama, Bangalore (IN); Dayananda Ubrangala, Kasaragod (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/890,081

(22) Filed: Sep. 19, 2024

(51) Int. Cl.
*G06F 16/334* (2025.01)

(52) U.S. Cl.
CPC .............................. *G06F 16/3346* (2019.01)

(58) Field of Classification Search
CPC .................................................. G06F 16/3346
See application file for complete search history.

(56) References Cited

U.S. PATENT DOCUMENTS

| | | | |
|---|---|---|---|
| 7,730,058 B2 * | 6/2010 | Sareen | G06F 16/3346 |
| | | | 707/769 |
| 12,306,860 B1 * | 5/2025 | Garg | G06F 16/338 |
| 2021/0192133 A1 * | 6/2021 | La Rocca | G06F 18/24 |

* cited by examiner

*Primary Examiner* — Jared M Bibbee (57) ABSTRACT

A method, computer program product, and computing system for processing telemetry data associated with a target abbreviated term and a plurality of expanded terms. A plurality of probabilistic tuples are generated from the telemetry data associated with the target abbreviated term. A neural network is trained using the plurality of probabilistic tuples by modifying, with each training epoch, input data to the neural network by coupling a target abbreviated term with an expanded term associated with the target abbreviated term that is randomly selected from the plurality of expanded terms.

20 Claims, 5 Drawing Sheets

SYSTEM AND METHOD FOR SEMANTIC SEARCHING OF ABBREVIATED TERMS USING TELEMETRY DATA-TRAINED NEURAL NETWORKS

BACKGROUND

Search engines experience challenges when addressing a search query that includes an abbreviated term (i.e., an abbreviation for an expanded or full term). This happens because abbreviated search queries often lack context and refer to domain-specific knowledge, making it difficult to correctly expand the search queries. This means that the performance of sophisticated large language models (LLMs) is often well-below users' expectations and that simpler natural language processing (NLP) techniques may compete in terms of search result accuracy since these techniques require less context. This problem is amplified in the case of LLMs that are trained on public information, where the LLMs try to predict the next word of the sentence. As such, conventional LLMs are inefficient when attempting to ascertain a correct or intended expanded term for a given abbreviated term.

In one example, a stock keeping unit (SKU) product search system allows users use to manage opportunities with their customers. However, a user's search query often include (almost exclusively) very short, specific, and abbreviated queries where the sellers expect to see an expanded product name they can tie with a SKU as a result. Failures of an underlying neural network or LLM to accurately predict and provide results for an intended expanded term, given an entered abbreviated term, are a common source of frustration for users of such systems.

BRIEF DESCRIPTION OF THE DRAWINGS

Like reference symbols in the various drawings indicate like elements.

DETAILED DESCRIPTION OF THE EMBODIMENTS

Implementations of the present disclosure produce custom language embeddings specifically targeted towards abbreviated terms (e.g., abbreviations) by combining search telemetry from users with a specific approach to train a neural network (e.g., a classification neural network) for recognizing a most likely expanded term associated with an abbreviated term. For example and as will be discussed in greater detail below, the semantic search training process dynamically changes the values of the input of the machine learning model in a way that is consistent with the statistical properties of search(es) extracted from user telemetry data. In this manner, the embeddings produced by the trained neural network are expected to perform better than pre-trained, default LLM embeddings because actual statistics about a target abbreviated terms are distilled into the embeddings of the neural network.

The semantic search training process described below processes telemetry data associated with a target abbreviated term and a plurality of expanded terms. For example, an abbreviated term is an abbreviation for an expanded term (e.g., "IBM" is an abbreviated term for the expanded term: "International Business Machines"; "M365" is an abbreviated term for the expanded term: "M365 Business Standard" and also for the expanded term: "M365 Copilot Managed"). As such, multiple expanded terms can map to a single abbreviated term. In this manner, the semantic search training process uses telemetry data associating an abbreviated term that is provided during a semantic search (i.e., "search engine methodology for interpreting the meaning of words and phrases") with a particular expanded term that is selected for use in the semantic search.

A plurality of probabilistic tuples are generated from the telemetry data associated with the target abbreviated term. For instance, the probabilistic tuples define all the expanded terms for a target abbreviated term and the probability that a given expanded term is selected to represent the target abbreviated term. As discussed above, telemetry data for semantic searches generally includes a history of user semantic searches including abbreviated terms entered by a user and the associated expanded term that the user ultimately selects for disambiguation of each abbreviated term (i.e., a user provides "M365" for a semantic search and selects "M365 Copilot Managed"). As there are various expanded terms that map to an abbreviated term, the probabilistic tuples provide a telemetry data-based representation of how a user (or set of users) has historically used abbreviated terms to represent particular expanded terms over time.

A neural network is trained using the plurality of probabilistic tuples by modifying, with each training epoch, input data to the neural network by coupling a target abbreviated term with an expanded term associated with the target abbreviated term that is randomly selected from the plurality of expanded terms. For example and in contrast to conventional approaches where the input data is fixed and iterated over across multiple training epochs, the semantic search training process trains the neural network to associate a particular target abbreviated term with a specific category of classification. By varying the input data with each training epoch to include a randomly chosen expanded term, the neural network is trained to associate the instances of an abbreviated term with expanded terms with a particular probability. This means that the predicted probabilities converge such that instances of an abbreviated term and expanded term belong to the same class.

Accordingly, the number of possible expanded terms associated with an abbreviated term can grow without bounds. For example, users searching for products associated with the abbreviation "M365" routinely sort through a wide variety of product names such as "M365 Business Standard", "M365 Copilot Managed", "M365 E5 Security" and many more. As opposed to formulating the embedding training task as a multi-label classification problem, which may seem natural but is bound to fail in practice due to the huge dimensionality and sparsity of the target space, the trained neural network includes a classification layer of the same size as the input vocabulary of abbreviations (e.g., resulting in no sparsity problem). In addition, the statistics of the use of expanded terms from the telemetry data is distilled into the neural network by dynamically changing the input data during training rather than directly as in multi-label classification.

The details of one or more implementations are set forth in the accompanying drawings and the description below. Other features and advantages will become apparent from the description, the drawings, and the claims.

The Semantic Search Training Process:

Referring to FIGS. 1-4, semantic search training process 10 processes 100 telemetry data associated with a target abbreviated term and a plurality of expanded terms. A plurality of probabilistic tuples are generated 102 from the telemetry data associated with the target abbreviated term. A neural network is trained 104 using the plurality of probabilistic tuples by modifying, with each training epoch, input data to the neural network by coupling a target abbreviated term with an expanded term associated with the target abbreviated term that is randomly selected from the plurality of expanded terms.

Figure 1:
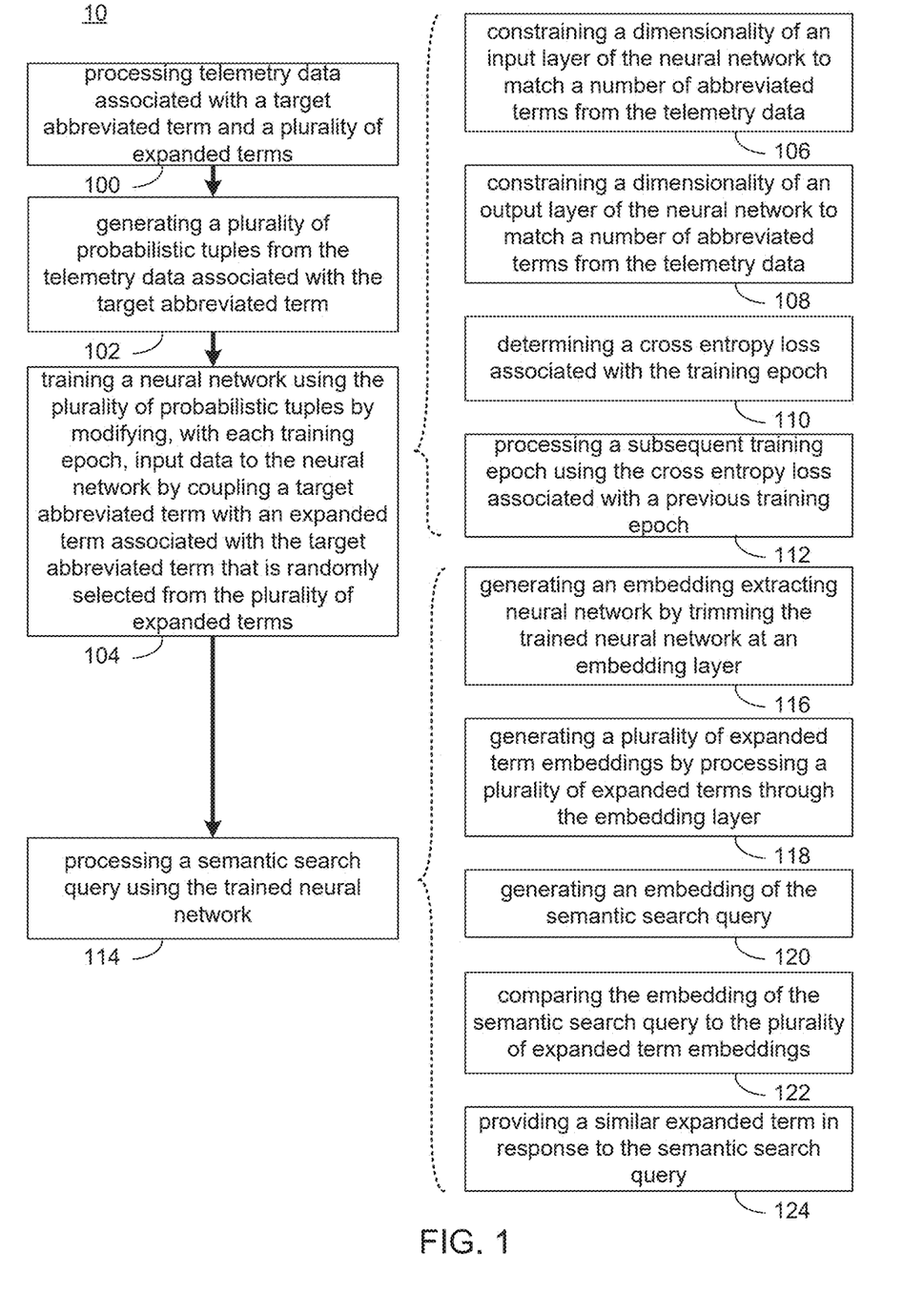
FIG. 1 is a flow chart of an implementation of a semantic search training process.

In some implementations, semantic search training process 10 processes 100 telemetry data associated with a target abbreviated term and a plurality of expanded terms. Telemetry data includes information generated during the processing of semantic search queries that describes the steps and results from any given semantic search query. For example, as a user interacts with a semantic search system (i.e., an electronic search system that processes semantic search queries and provides results corresponding to the semantic search query from a database of information and/or from Internet-based information according to a data searching technique which uses the intent and contextual meaning behind a semantic search query to deliver more relevant results), the user may provide a semantic search query (i.e., a query for content from a database and/or from Internet resources that includes a word or combination of words that is processed to ascertain its meaning) including an abbreviated term that maps to one or more expanded terms. A target abbreviated term is an abbreviation provided within the semantic search query that maps to an expanded term (i.e., a whole word or phrase represented by an abbreviated term).

Figure 2:
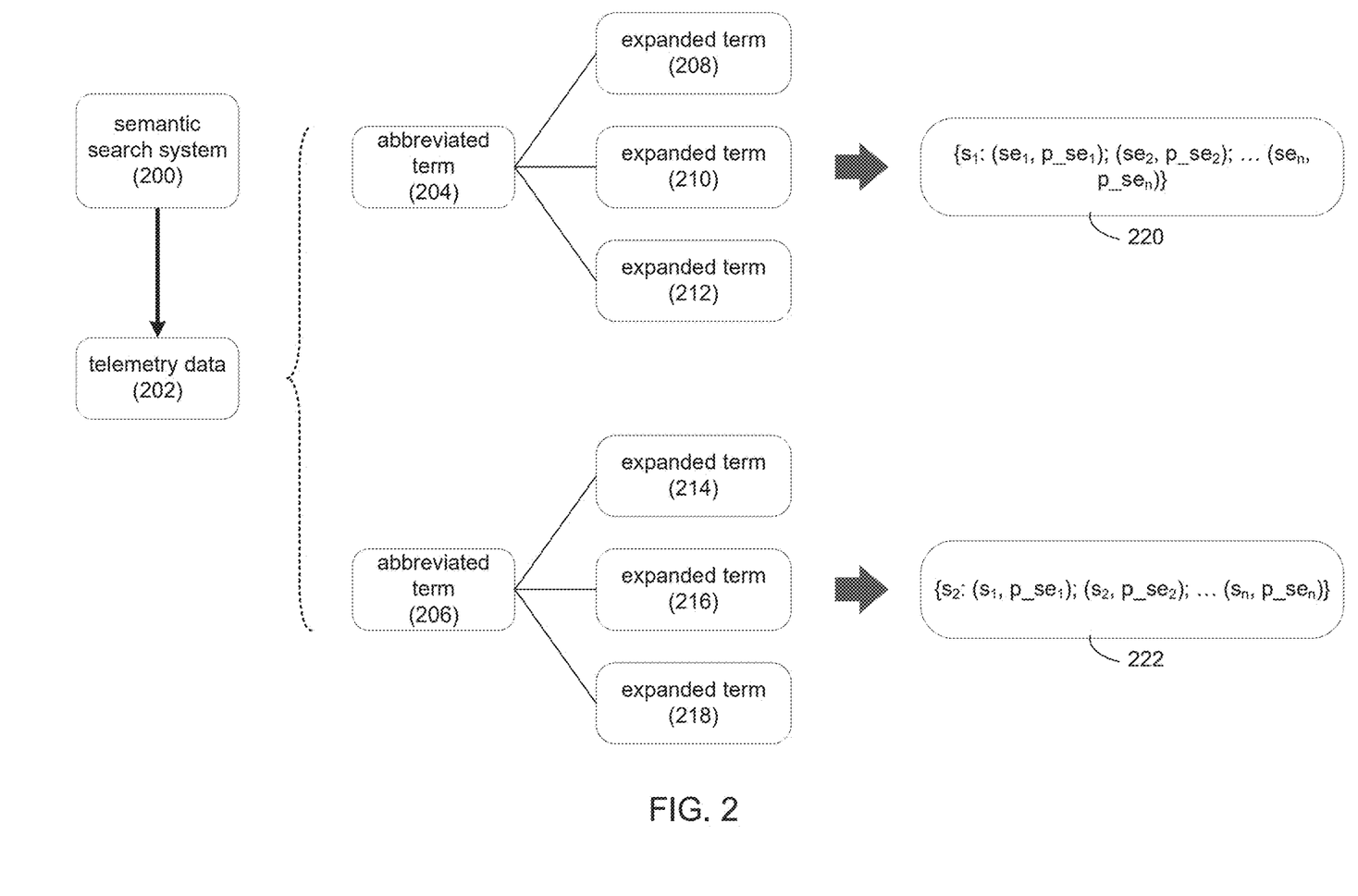
FIG. 2 is a diagrammatic view of the processing of telemetry data according to an implementation of the semantic search training process of FIG. 1.

Referring also to FIG. 2, a semantic search system (e.g., semantic search system 200) processes various semantic searches concerning words or phrases from a database of information and/or Internet-based resources. In some implementations, semantic search system 200 generates telemetry data (e.g., telemetry data 202) concerning abbreviated terms (e.g., abbreviated terms 204, 206) provided in semantic search queries and expanded terms associated with each abbreviated term that are selected (e.g., by a user) for querying (e.g., expanded terms 208, 210, 212 for abbreviated term 204 and expanded terms 214, 216, 218 for abbreviated term 206). In one example, telemetry data 202 includes statistics concerning the occurrence of each expanded term selected for a particular abbreviated term within semantic search queries. In some implementations, semantic search training process 10 processes 100 telemetry data 202 by generating a telemetry table as shown below in Table 1:

TABLE 1

| Abbreviated Term | Expanded Term |
|---|---|
| $s_1$ | $se_{1,1}$ |
| $s_2$ | $se_{2,1}$ |

TABLE 1-continued

| Abbreviated Term | Expanded Term |
|---|---|
| ... | ... |
| $s_1$ | $se_{1,2}$ |
| $s_n$ | $se_{n,m}$ |

As shown in Table 1, semantic search queries include various abbreviated terms (e.g., $s_1$, $s_2$, and $s_n$, where $s_i$ represents each "i-th" unique abbreviated term for "n" individual abbreviated terms) and respective expanded terms (e.g., $se_{1,1}$, $se_{2,1}$, and $s_{n,n}$, where $se_{i,j}$ represents each "j-th" unique expanded term for a respective "i-th" abbreviated term, across "n" individual abbreviated terms and "m" expanded terms). The processing action includes collecting the distinct abbreviated terms (using a "groupby" operation on the abbreviated terms in Table 1) and gathering statistics about their expanded terms for each abbreviated term.

In some implementations, semantic search training process 10 generates 102 a plurality of probabilistic tuples from the telemetry data associated with the target abbreviated term. For example, for a target abbreviated term, $s_i$, semantic search training process 10 generates a list with each expanded term, $se_{i,j}$, and the number of occurrences of each expanded term, $N\_se_i$, as follows: $[(se_{i,1}, N\_se_{i,1}), (se_{i,2}, N\_se_{i,2}), \ldots, (se_{i,m}, N\_se_{i,m})]$. In some implementations, the probabilistic tuple includes a probability associated with each expanded term as determined by the telemetry data associated with the target abbreviated term. For example, semantic search training process 10 evaluates the relative proportion of each expanded term, $se_{i,j}$, among all of the expanded terms as shown below in Equation 1:

$$p\_se_{i,j} = N\_se_{i,j}/\text{Sum}(N\_se_{i,j}, j = 1 \text{ to } N_i) \qquad (1)$$

where each $p\_se_{i,j}$ is a real number between 0 and 1 (interpretable as a probability or relative importance) and the sum over index j for a given index i for a given abbreviated term is normalized such that $\text{Sum}(p\_se_{i,j}=1 \text{ to } N_i)=1$.

Referring again to FIG. 2, semantic search training process 10 generates 102 probabilistic tuples 220, 222 for abbreviated terms 204, 206 and their corresponding expanded terms (e.g., expanded terms 208, 210, 212, 214, 216, 218), respectively. In one example, semantic search training process 10 generates a JSON data structure that links each abbreviated term with a list of expanded term which all have an associated relative importance as follows:

$$\{s_1 : [(se_{1,1}, p\_se_{1,1}), (se_{12}, p\_se_{1,2}), (se_{1,3}, p\_se_{1,3})(se_{1,N1}, p\_se_{1,N1}),$$

$$s_2 : [(se_{2,1}, p\_se_{2,1}), (se_{22}, p\_se_{2,2}), (se_{2,3}, p\_se_{2,3})(se_{2,N2}, p\_se_{2,N2}), \ldots ,$$

$$s_n : [(se_{n,1}, p\_se_{n,1}), (se_{n2}, p\_se_{n,2}), (se_{n,3}, p\_se_{n,3})(se_{n,Nn}, p\_se_{n,Nn})\}$$

In some implementations, semantic search training process 10 generates 102 probabilistic tuples of the form (abbreviated term, expanded term) leveraging the processed telemetry data structure constructed above. For example, consider an abbreviated term, $s_i$. This abbreviated term may be associated with $N_i$ possible expanded terms. Accordingly, semantic search training process 10 uses a function, D, which takes in as argument an abbreviated term, $s_i$, and returns a tuple ($s_i$, $se_{i,j}$) where the expanded term $se_{i,j}$ where the index j of the expanded product name runs over j=1 to $N_i$ and is chosen randomly with probability $p\_se_{i,j}$. In other words, the function D has the following signature as shown in Equation 2:

$$D(s_i) \Rightarrow (s_i, se_{i,j}), \quad (2)$$

where the index j is chosen randomly from the $N_i$ possibilities with probability $p\_se_{i,j}$.

In some implementations, once a probabilistic tuple has been generated, semantic search training process 10 aggregates both strings $s_i$ and $se_{i,j}$ together into a single string $s_i+se_{i,j}$ where the "+" symbol stands for a string aggregation strategy. Semantic search training process 10 is agnostic to the specific string aggregation strategy but in practice a simple implementation would be to simply concatenate the two strings together. However, it will be appreciated that other concatenation or aggregation approaches may be used within the scope of the present disclosure. In some implementations, generating 102 the probabilistic tuple includes input data preparation which is summarized by a function/as shown in Equation 3:

$$I(s_i) \Rightarrow s_i + se_{i,j}, \quad (3)$$

where $se_{i,j}$ is given by the probabilistic D function as described above.

In some implementations, semantic search training process 10 trains 104 a neural network using the plurality of probabilistic tuples by modifying, with each training epoch, input data to the neural network by coupling a target abbreviated term with an expanded term associated with the target abbreviated term that is randomly selected from the plurality of expanded terms. A neural network is a network of connected units or nodes called neurons that are connected by edges. Each neuron receives signals from connected neurons, then processes them and sends a signal to other connected neurons. In one example, each signal is a number, and the output of each neuron is computed by some non-linear function of the sum of its inputs, called the activation function. The strength of the signal at each connection is determined by a weight, which adjusts during the training process. In some implementations, the neurons are aggregated into layers with different layers performing different transformations on their inputs. In one example, signals travel from the first layer (i.e., the input layer) to the last layer (i.e., the output layer), possibly passing through multiple intermediate layers (i.e., hidden layers).

In some implementations, semantic search training process 10 is agnostic to the specific neural network language model architecture. For example, the neural network may include one layer used as an embedding layer. In one example, the embedding layer is a generic feature of language models and constitutes one of the final layers in the case of a multi-layer perceptron (MLP) architecture. In another example, the embedding layer is the most central layer in the case of encoder/decoder architectures. As such, it will be appreciated that various neural network architectures may be used within the scope of the present disclosure. Similarly, various layers may be used as embedding layers within the scope of the present disclosure.

Figure 3:
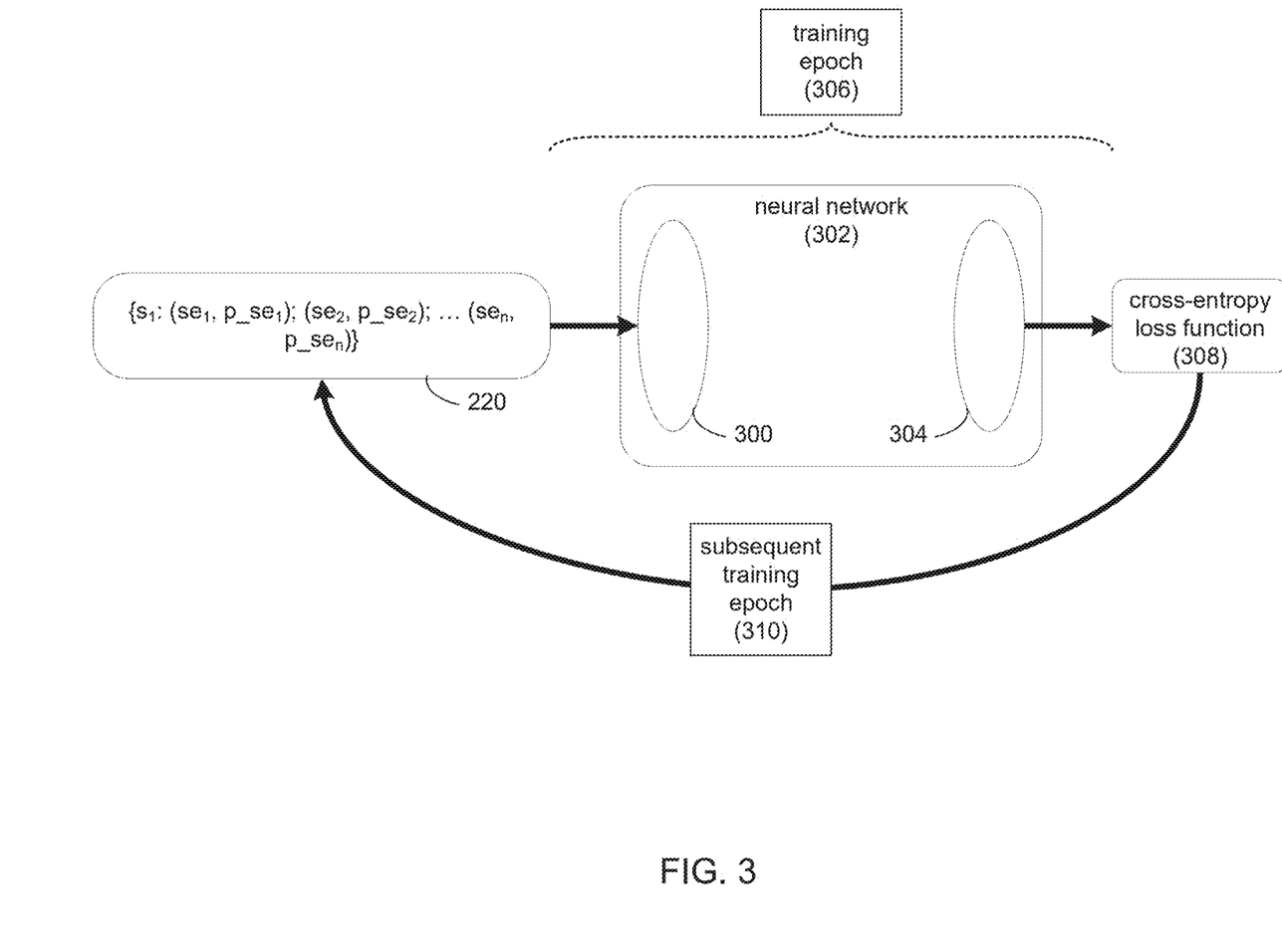
FIG. 3 is a diagrammatic view of the training of a neural network with telemetry data according to an implementation of the semantic search training process of FIG. 1.

In some implementations, training 104 the neural network includes constraining 106 a dimensionality of an input layer of the neural network to match a number of abbreviated terms from the telemetry data. For example and as shown in FIG. 3, semantic search training process 10 defines the dimensionality of the input layer (e.g., input layer 300) of a neural network (e.g., neural network 302) to be "n" to match the number of abbreviated terms gathered in the telemetry dataset. Similarly and in some implementations, training 104 the neural network includes constraining 108 a dimensionality of an output layer of the neural network to match a number of abbreviated terms from the telemetry data. For example, semantic search training process 10 constrains 108 the output layer (e.g., output layer 304) of neural network 302 to also match the same n-dimensionality so that each component of this layer may be interpreted as the classification probability to belong to one of n classes/categories of the neural network. In some implementations, each class/category is identified as belonging to each one of the abbreviated terms. Therefore, the neural network can be seen as a function, P, which takes in as an argument an abbreviated term, $s_i$, (of which there are n such terms) and returns a vector of matching dimensionality n as shown in Equation 4:

$$P(s_i) \rightarrow (\text{pred}\_s_{i,1}, \text{pred}\_s_{i,2}, \text{pred}\_s_{i,3}, \ldots, \text{pred}\_s_{i,n}). \quad (4)$$

In some implementations, semantic search training process 10 modifies, with each training epoch, input data to the neural network by coupling a target abbreviated term with an expanded term associated with the target abbreviated term that is randomly selected from the plurality of expanded terms. For example, the input data is dynamically changing at each epoch. In one example as shown in FIG. 3 and at the beginning of training of a neural network (e.g., neural network 302) at training epoch k=1 (e.g., training epoch 306) and an abbreviated term $s_i$ (e.g., input data 220). Instead of sending $s_i$ directly into the neural network as the i-th component of its input layer (e.g., input layer 300), semantic search training process 10 runs input data 220 through the probabilistic function D which is aggregated with one of its randomly chosen expanded product name $se_{i,j}$ as described above. In other words, it is the random input $I(s_i)\_\{k=1\}$ which goes in as the i-th component of input layer 300 at epoch k=1. Doing the same for all abbreviated search queries, the n-dimensional input components at the first epoch of training (k=1) are given by $[I(s_1)\_\{k=1\}, I(s_2)\_\{k=1\}, I(s_3)\_\{k=1\}, \ldots I(s_n)\_\{k=1\}]$. In some implementations, this produces a n-dimensional vector of prediction which is quantified for accuracy by a cross-entropy loss function. Internal parameters of the neural network are then adjusted using a traditional backpropagation algorithm.

In some implementations, training 104 the neural network includes determining 110 a cross entropy loss associated with the training epoch. For example, each time input data is processed through a neural network, that constitutes a training epoch. With each training epoch, the neural network further associates a given abbreviated term (e.g., the i-th abbreviated term $s_i$) with the i-th category of the classification layer of the neural network. Accordingly, the predicted probabilities for a well-trained network should eventually converge (i.e., after training) so that: $\text{pred}\_s_{i,j} \rightarrow 1$ (when j=i) and $\text{pred}\_s_{i,j} \rightarrow 0$ (with j different from i). In some implementations, the mismatch between this ideal output and the one predicted by the untrained neural network is quantified using the cross-entropy loss function (e.g., cross-entropy loss function 308). For example, cross-entropy loss function 308 measures the difference between the discovered probability distribution of a classification model and the predicted values. In some implementations, cross-entropy loss function 308 is used to find the optimal solution by adjusting the weights of neural network 302 during training. The objective of cross-entropy loss function 308 is to minimize the error between the actual and predicted outcomes. For example, a lower cross-entropy value indicates better performance. In some implementations, semantic search training process 10 determines 110 cross-entropy loss using cross-entropy function 308, input data 220, and the output from output layer 304.

In some implementations, training 104 the neural network includes processing 112 a subsequent training epoch using the cross-entropy loss associated with a previous training epoch. For example and continuing with the above example, suppose semantic search training process 10 determines 110 a cross-entropy loss associated with the first training epoch. In this example, semantic search training process 10 proceeds with a second, or subsequent, training epoch (e.g., subsequent training epoch 310) k=2. In some implementations, the n-dimensional input vector to the model is now randomly chosen to $[I(s_1)\_\{k=2\}, I(s_2)\_\{k=2\}, I(s_3)\_\{k=2\}, I(s_n)\_\{k=2\}]$ according to telemetry data 202 and the plurality of probabilistic tuples. In some implementations, the input data vector is different from the one generated at the first epoch k=1 but the classification formulation remains identical, (i.e., where the input entry $s_i$ should be classified into the i-th output category with highest possible probability). For example, each time the input data preparation function is called on the same argument $s_i$ (for a subsequent training epoch), semantic search training process 10 returns a different string $s_i+se_{i,j}$ since the index j is chosen randomly based on the probabilities derived from the processed telemetry data as described above.

Once this second batch of input data is passed through neural network 302 and backpropagation carried out for a second time, semantic search training process 10 moves on to the third epoch and so on making sure to always randomize the input data while keeping the classification formulation fixed. In some implementations, running this training procedure over a large number of epochs k>>1 and monitoring the decrease of the cross-entropy loss function produces a well-trained neural network.

In some implementations, training the classification model (e.g., neural network 302) teaches the neural network that all "'abbreviated term 1'+'possible expanded terms'" should belong to the single "abbreviated term" class and that all instances of "'abbreviated term 2'+'possible expanded terms'" should belong to the unique "abbreviated term 2" class. After training neural network 302, the internal embedding layer of neural network 302 maps the correspondence between abbreviated terms and expanded terms (as a byproduct of the classification training).

Figure 4:
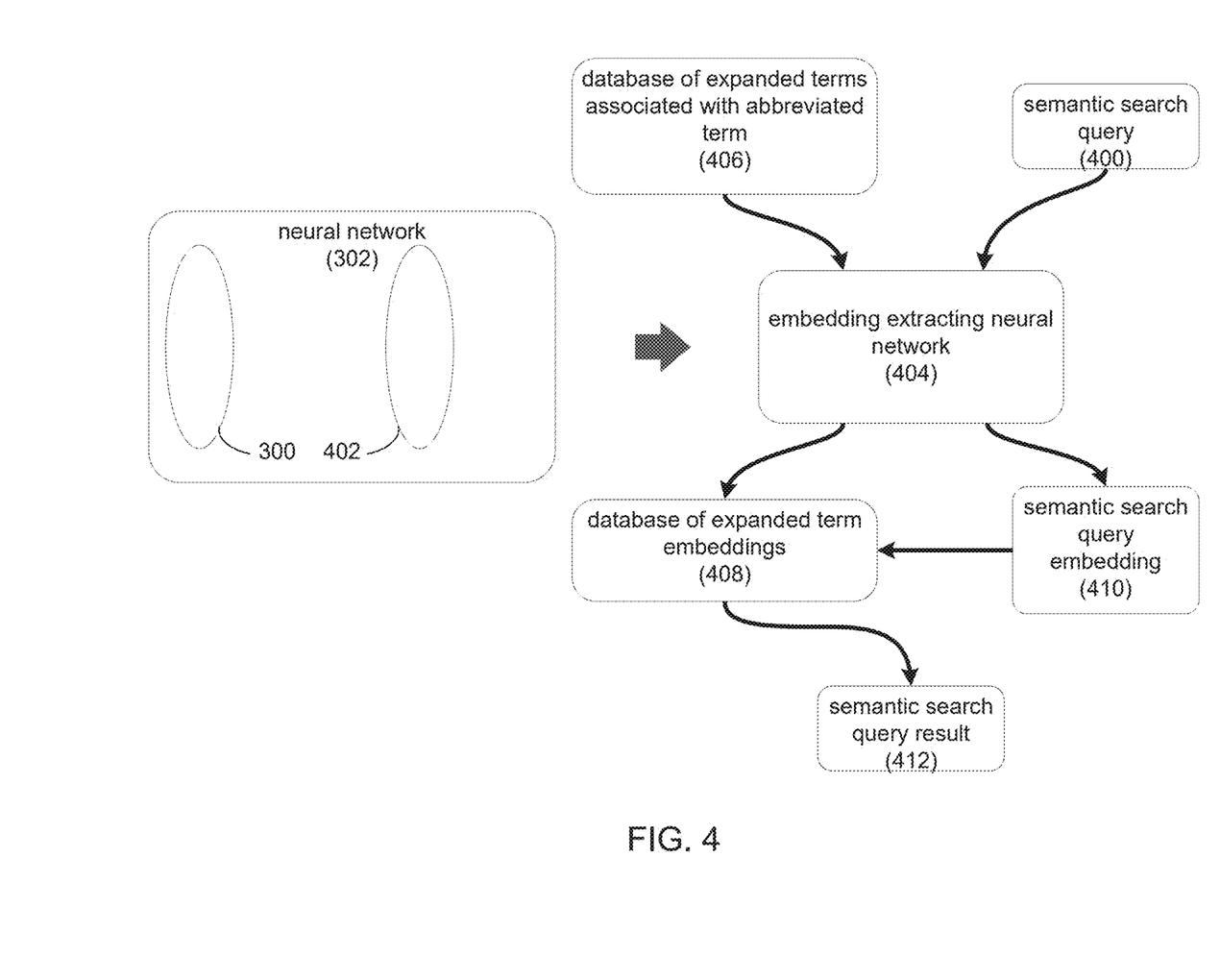
FIG. 4 is a diagrammatic view of the processing of semantic search query using a trained neural network according to an implementation of the semantic search training process of FIG. 1.

In some implementations, semantic search training process 10 processes 114 a semantic search query using the trained neural network. For example and described above, semantic search training process 10 processes 114 a semantic search query (i.e., a query for content from a database and/or from Internet resources that includes a word or combination of words) using a semantic search engine to ascertain its meaning. In some implementations, with the classification model (e.g., neural network 302) fully trained, semantic search training process 10 uses neural network 302 to extract embeddings for abbreviated terms from the semantic search query. Referring also to FIG. 4 and in some implementations, semantic search training process 10 processes 114 semantic search query 400 using the trained neural network (e.g., neural network 302).

In some implementations, processing 114 the semantic search query using the trained neural network includes generating 116 an embedding extracting neural network by trimming the trained neural network at an embedding layer. For example, semantic search training process 10 trims off neural network 302 at the embedding layer. In one example where neural network 302 includes multi-layer perceptron (MLP) architecture, semantic search training process 10 trims neural network 302 by removing the final classification layer (e.g., classification layer 402). In the example of encoder-decoder architectures, semantic search training process 10 trims neural network 302 by stopping neural network 302 at the most central layer separating the encoder part of the decoder one. In general, any neural network architecture can be trimmed off so as to extract the appropriate embedding layer. The trimmed neural network is shown in FIG. 4 as embedding extracting neural network 404.

In some implementations, processing 114 the semantic search query using the trained neural network includes generating 118 a plurality of expanded term embeddings by processing a plurality of expanded terms through the embedding layer. For example, semantic search training process 10 generates 118 a plurality of expanded term embeddings by processing all known expanded terms through embedding extracting neural network 404 and collecting their embedding representations. In one example, the known expanded terms are stored in a database (e.g., database of expanded terms associated with abbreviated terms 406). In some implementations, the plurality of expanded term embeddings are stored in a database or other data structure (e.g., database of expanded term embeddings 408).

In some implementations, processing 114 the semantic search query using the trained neural network includes: generating 120 an embedding of the semantic search query; comparing 122 the embedding of the semantic search query to the plurality of expanded term embeddings; and providing 124 a similar expanded term in response to the semantic search query. For example, semantic search training process 10 generates 120 an embedding of semantic search query 400 by processing semantic search query using embedding extracting neural network 302 to produce semantic search query embedding 410. Semantic search training process 10 compares 122 semantic search query embedding 410 against all embeddings in database of expanded term embeddings 408 and determines a closest match (in terms of a similarity metric (e.g., cosine similarity)). Semantic search training process 10 provides 124 a similar expanded term as a semantic search query result (e.g., semantic search query result 412). In one example, semantic search training process 10 provides a threshold or predefined number of most similar expanded terms as semantic search query result 412. In another example, semantic search training process 10 provides a most similar expanded term for the abbreviated term from semantic search query 400 as semantic search query result 412.

Figure 5:
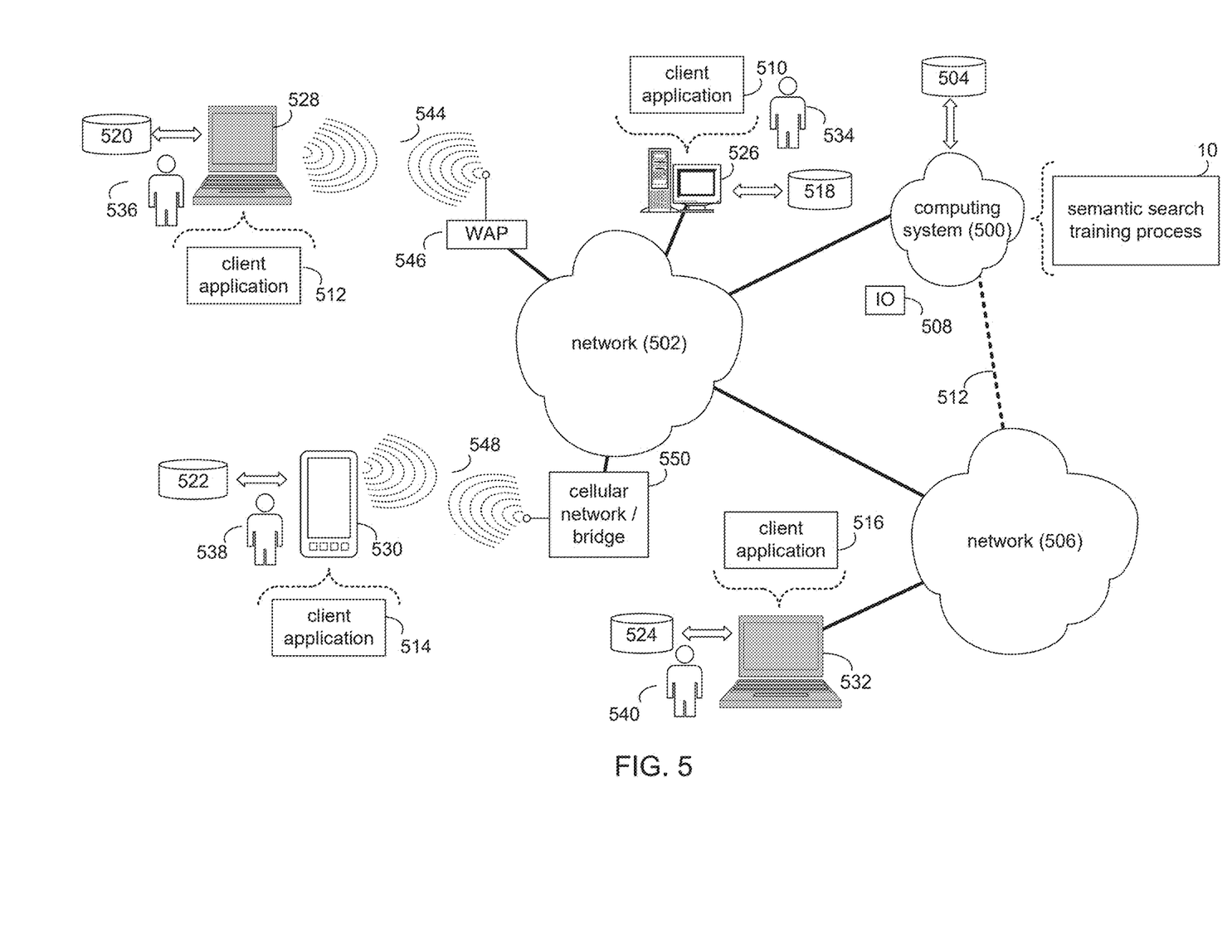
FIG. 5 is a diagrammatic view of computer system and the semantic search training process coupled to a distributed computing network.

System Overview:

Referring to FIG. 5, a semantic search training process 10 is shown to reside on and is executed by computing system 500, which is connected to network 502 (e.g., the Internet or a local area network). Examples of computing system 500 include: a Network Attached Storage (NAS) system, a Storage Area Network (SAN), a personal computer with a memory system, a server computer with a memory system, and a cloud-based device with a memory system. A SAN includes one or more of a personal computer, a server computer, a series of server computers, a minicomputer, a mainframe computer, a RAID device, and a NAS system.

The various components of computing system 500 execute one or more operating systems, examples of which include: Microsoft® Windows®; Mac® OS X®; Red Hat® Linux®, Windows® Mobile, Chrome OS, Blackberry OS, Fire OS, or a custom operating system (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

The instruction sets and subroutines of semantic search training process 10, which are stored on storage device 504 included within computing system 500, are executed by one or more processors (not shown) and one or more memory architectures (not shown) included within computing system 500. Storage device 504 may include: a hard disk drive; an optical drive; a RAID device; a random-access memory (RAM); a read-only memory (ROM); and all forms of flash memory storage devices. Additionally or alternatively, some portions of the instruction sets and subroutines of semantic search training process 10 are stored on storage devices (and/or executed by processors and memory architectures) that are external to computing system 500.

In some implementations, network 502 is connected to one or more secondary networks (e.g., network 506), examples of which include: a local area network; a wide area network; or an intranet.

Various input/output (IO) requests (e.g., IO request 508) are sent from client applications 510, 512, 514, 516 to computing system 500. Examples of IO request 508 include data write requests (e.g., a request that content be written to computing system 500) and data read requests (e.g., a request that content be read from computing system 500).

The instruction sets and subroutines of client applications 510, 512, 514, 516, which may be stored on storage devices 518, 520, 522, 524 (respectively) coupled to client electronic devices 526, 528, 530, 532 (respectively), may be executed by one or more processors (not shown) and one or more memory architectures (not shown) incorporated into client electronic devices 526, 528, 530, 532 (respectively). Storage devices 518, 520, 522, 524 may include: hard disk drives; tape drives; optical drives; RAID devices; random access memories (RAM); read-only memories (ROM), and all forms of flash memory storage devices. Examples of client electronic devices 526, 528, 530, 532 include personal computer 526, laptop computer 528, smartphone 530, laptop computer 532, a server (not shown), a data-enabled, and a dedicated network device (not shown). Client electronic devices 526, 528, 530, 532 each execute an operating system.

Users 534, 536, 538, 540 may access computing system 500 directly through network 502 or through secondary network 506. Further, computing system 500 may be connected to network 502 through secondary network 506, as illustrated with link line 542.

The various client electronic devices may be directly or indirectly coupled to network 502 (or network 506). For example, personal computer 526 is shown directly coupled to network 502 via a hardwired network connection. Further, laptop computer 532 is shown directly coupled to network 506 via a hardwired network connection. Laptop computer 528 is shown wirelessly coupled to network 502 via wireless communication channel 544 established between laptop computer 528 and wireless access point (e.g., WAP) 546, which is shown directly coupled to network 502. WAP 546 may be, for example, an IEEE 802.11a, 802.11b, 802.11g, 802.11n, Wi-Fi®, and/or Bluetooth® device that is capable of establishing a wireless communication channel 544 between laptop computer 528 and WAP 546. Smartphone 530 is shown wirelessly coupled to network 502 via wireless communication channel 548 established between smartphone 530 and cellular network/bridge 550, which is shown directly coupled to network 502.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be used. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this A, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object-oriented programming language. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet.

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general-purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, not at all, or in any combination with any other flowcharts depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method, executed on a computing device, comprising:
   processing telemetry data associated with a target abbreviated term and a plurality of expanded terms;
   generating a plurality of probabilistic tuples from the telemetry data associated with the target abbreviated term; and
   training a neural network using the plurality of probabilistic tuples by modifying, with each training epoch, input data to the neural network by coupling a target abbreviated term with an expanded term associated with the target abbreviated term that is randomly selected from the plurality of expanded terms.

2. The computer-implemented method of claim 1, further comprising:
   processing a semantic search query using the trained neural network.

3. The computer-implemented method of claim 1, wherein training the neural network includes constraining a dimensionality of an input layer of the neural network to match a number of abbreviated terms from the telemetry data.

4. The computer-implemented method of claim 1, wherein training the neural network includes constraining a dimensionality of an output layer of the neural network to match a number of abbreviated terms from the telemetry data.

5. The computer-implemented method of claim 1, wherein the probabilistic tuple includes a probability associated with each expanded term as determined by the telemetry data associated with the target abbreviated term.

6. The computer-implemented method of claim 1, wherein training the neural network includes determining a cross entropy loss associated with the training epoch.

7. The computer-implemented method of claim 6, wherein training the neural network includes processing a subsequent training epoch using the cross-entropy loss associated with a previous training epoch.

8. A computing system comprising:
   a memory; and
   a processor configured to:
      process telemetry data associated with a target abbreviated term and a plurality of expanded terms;

generate a plurality of probabilistic tuples from the telemetry data associated with the target abbreviated term; and train a neural network using the plurality of probabilistic tuples by modifying, with each training epoch, input data to the neural network by:
constraining a dimensionality of an input layer of the neural network to match a number of abbreviated terms from the telemetry data; and
coupling a target abbreviated term with an expanded term associated with the target abbreviated term that is randomly selected from the plurality of expanded terms.

9. The computing system of claim 8, wherein the processor is further configured to:
process a semantic search query using the trained neural network.

10. The computing system of claim 9, wherein processing the semantic search query using the trained neural network includes:
generating an embedding extracting neural network by trimming the trained neural network at an embedding layer;
generating a plurality of expanded term embeddings by processing a plurality of expanded terms through the embedding layer;
generating an embedding of the semantic search query;
comparing the embedding of the semantic search query to the plurality of expanded term embeddings; and
providing a similar expanded term in response to the semantic search query.

11. The computing system of claim 8, wherein the probabilistic tuple includes a probability associated with each expanded term as determined by the telemetry data associated with the target abbreviated term.

12. The computing system of claim 8, wherein the probabilistic tuple includes a probability associated with each expanded term as determined by the telemetry data associated with the target abbreviated term.

13. The computing system of claim 8, wherein training the neural network includes determining a cross entropy loss associated with the training epoch.

14. The computing system of claim 13, wherein training the neural network includes processing a subsequent training epoch using the cross-entropy loss associated with a previous training epoch.

15. A computer program product residing on a non-transitory computer readable medium having a plurality of instructions stored thereon which, when executed by a processor, cause the processor to perform operations comprising:
processing telemetry data associated with a target abbreviated term and a plurality of expanded terms;
generating a plurality of probabilistic tuples from the telemetry data associated with the target abbreviated term; and
training a neural network using the plurality of probabilistic tuples by modifying, with each training epoch, input data to the neural network by coupling a target abbreviated term with an expanded term associated with the target abbreviated term that is randomly selected from the plurality of expanded terms;
processing a semantic search query using the trained neural network by:
generating an embedding extracting neural network by trimming the trained neural network at an embedding layer;
generating a plurality of expanded term embeddings by processing a plurality of expanded terms through the embedding layer;
generating an embedding of the semantic search query;
comparing the embedding of the semantic search query to the plurality of expanded term embeddings; and
providing a similar expanded term in response to the semantic search query.

16. The computer program product of claim 15, wherein training the neural network includes constraining a dimensionality of an input layer of the neural network to match a number of abbreviated terms from the telemetry data.

17. The computer program product of claim 15, wherein training the neural network includes constraining a dimensionality of an output layer of the neural network to match a number of abbreviated terms from the telemetry data.

18. The computer program product of claim 15, wherein the probabilistic tuple includes a probability associated with each expanded term as determined by the telemetry data associated with the target abbreviated term.

19. The computer program product of claim 15, wherein training the neural network includes determining a cross entropy loss associated with the training epoch.

20. The computer program product of claim 19, wherein training the neural network includes processing a subsequent training epoch using the cross-entropy loss associated with a previous training epoch.

* * * * *